May 3, 1966 R. H. BLAKELEY 3,248,923
METHOD OF CALIBRATING TENSION INDICATING BOLT
Filed Dec. 26, 1962
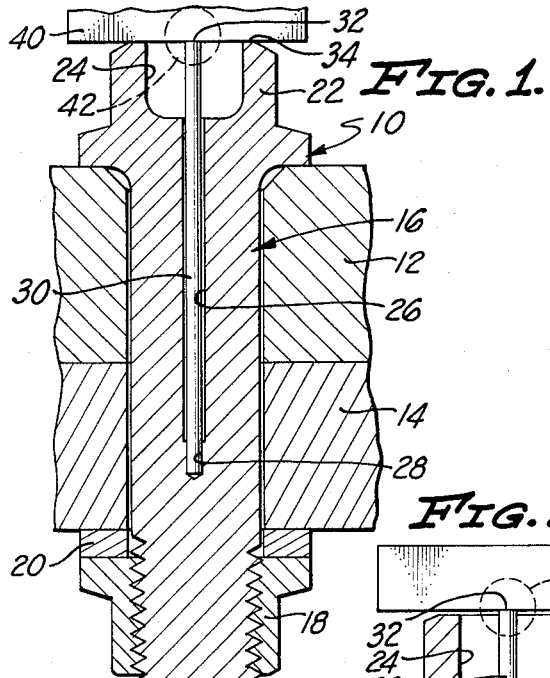
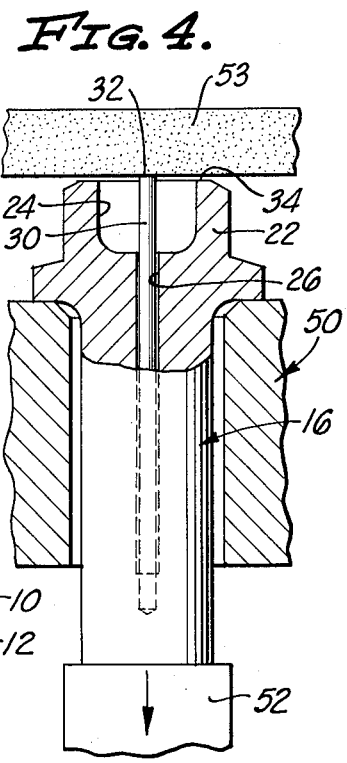
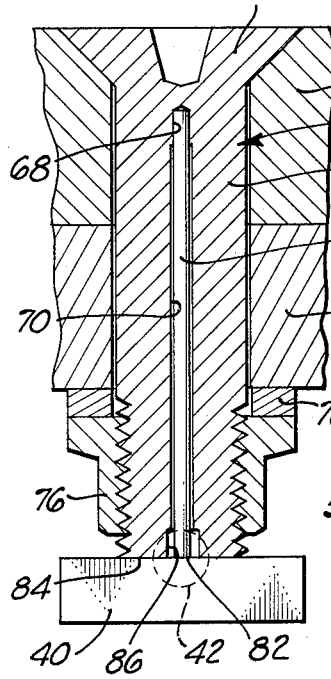
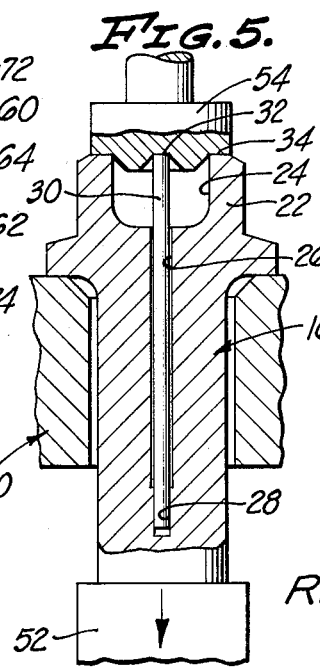
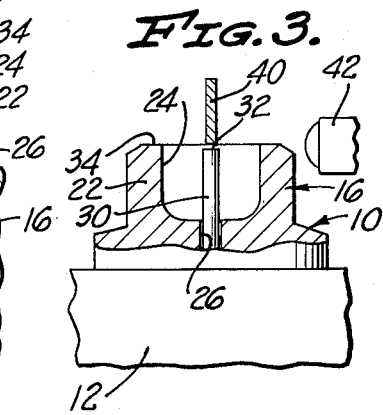
INVENTOR.
RICHARD H. BLAKELEY
BY HIS ATTORNEYS
HARRIS, KIECH, RUSSELL & KERN United States Patent Office 3,248,923
Patented May 3, 1966

3,248,923
METHOD OF CALIBRATING TENSION
INDICATING BOLT
Richard H. Blakeley, 2608 Via Ramon,
Palos Verdes Estates, Calif.
Filed Dec. 26, 1962, Ser. No. 247,167
3 Claims. (Cl. 73—1)

The present invention relates in general to a calibrated structure having means for indicating a predetermined stress therein and, more particularly, to a calibrated, tensionable fastening device having means for indicating the attainment of a predetermined tension in a tensionable fastening member, such as a bolt, screw, or the like, forming part of the device.

A primary object of the invention is to provide a calibrated fastening device having means for indicating the achievement of a predetermined tension in a fastening member of the device with extreme accuracy.

Various highly-accurate calibrated fastening devices are available, but there are extremely expensive and at least one type cannot be reused. Another and important object of the invention is to provide a highly-accurate calibrated fastening device which is much less expensive than currently-available ones having the same degree of accuracy, and which is also reusable (provided that it has not been stressed to such an extent in use as to produce a permanent set).

Considering the present invention more specifically, an important object thereof is to provide a tensionable, calibrated fastening device which includes: a tensionable fastening member having an axial hole in one end thereof; a pin in the hole and having its inner end secured to the fastening member and being free to move axially relative to the fastening member between its secured end and the outer end thereof; and registerable indicia on the fastening member and on the free portion of the pin for indicating a predetermined tension in the fastening member.

With the foregoing construction, the fastening device may be calibrated by tensioning the fastening member thereof to the desired predetermined extent, and then providing registering indicia on the fastening member and on the free portion of the pin. When the calibrated fastening device is subsequently installed at the location where it is to be used, the fastening member is preloaded in tension until the registerable indicia on the fastening member and on the free portion of the pin are in register. Under these conditions, the fastening member is preloaded in tension to precisely the desired extent.

Another object of the invention is to provide a calibrated fastening device of the foregoing character wherein the registerable indicia on the fastening member and on the free portion of the pin comprise registerable end faces thereon.

Preferably, the calibrated fastening device of the invention comprises a tensionable fastening member externally threaded at one end and having a head at its other end, the axial hole for the indicating pin being formed in either end. However, an important object of the invention is to provide an embodiment wherein the axial hole for the indicating pin is formed in the headed end of the fastening member and terminates short of the threads on the threaded end thereof by a distance at least equal to half the diameter of the fastening member. With this construction, the presence of the axial hole for the indicating pin results in no reduction in the tensile strength of the fastening member, whereas locating such axial hole in the threaded end does result in some loss in tensile strength, particularly with small-diameter fastening members. However, calibrated fastening devices of the invention wherein the axial holes for the indicating pins are in the threaded ends of the fastening members nevertheless have many applications.

Another object of the invention is to provide a method of calibrating a fastening device of the character hereinbefore set forth which includes tensioning the fastening member to the desired extent, and then registering indicia on the fastening member and the pin while the fastening member is in tension. Where the indicia are end faces of the fastening member and the indicating pin, such registering of the indicia may be produced by simultaneous grinding of the end faces on the fastening member and the indicating pin, by pressing the indicating pin into a reduced-diameter inner end of the axial hole until the outer end of the indicating pin is flush with the adjacent end of the fastening member, and the like. In the case where the indicating end faces of the indicating pin and the fastening member are registered by pressing the indicating pin into the fastening member until the indicating end face on the pin is flush with the indicating end face on the fastening member, the two indicating end faces are preferably preground until they are perpendicular to the respective axes of the pin and the fastening member.

Another and important object of the invention is to provide a method of setting a calibrated fastening device of the foregoing nature which includes the steps of: placing a gauge against the registerable end faces of the fastening member and the indicating pin; back lighting the gauge and end portions of the fastening member and the indicating pin adjacent the registerable end faces thereof; and tensioning the fastening member until the end faces of the fastening member and the indicating pin are in perfect register, as indicated by lack of light transmission between the gauge and the end face of the fastening member, or between the gauge and the end face of the pin.

The foregoing objects, advantages, features and results of the present invention, together with various other objects, advantages, features and results thereof which will be evident to those skilled in the calibrated fastener art in the light of this disclosure, may be achieved with the exemplary embodiments of the invention described in detail hereinafter and illustrated in the accompanying drawing, in which:

FIG. 1 is a longitudial sectional view of a calibrated fastening device of the invention showing the device installed and preloaded in tension to the extent for which it is designed;

FIG. 2 is a fragmentary sectional view duplicating a portion of FIG. 1, but showing the calibrated fastening device in a state of insufficient preloading;

FIG. 3 is a view similar to FIG. 2, but taken in a plane perpendicular thereto and showing the calibrated fastening device of the invention in a state of excessive preloading;

FIG. 4 is a fragmentary longitudinal sectional view illustrating one way of calibrating the fastening device of FIGS. 1 to 3;

FIG. 5 is a fragmentary longitudinal sectional view illustrating another way of calibrating the fastening device of FIGS. 1 to 3 of the drawing; and FIG. 6 is a longitudinal sectional view of another embodiment of the calibrated fastening device of the invention and showing same preloaded in tension to the extent for which it is designed.

Referring initially to FIG. 1 of the drawing, illustrated therein is a calibrated fastener 10 of the invention which is shown as extending through and securing together two structural members 12 and 14. In this particular embodiment, the fastener 10 includes a bolt 16 externally threaded at one end to receive a nut 18 of any suitable type. A lock washer 20 is preferably installed under the nut 18. The other end of the bolt 16 is provided with a head 22 of any suitable type, such head having in its outer end an axial recess 24 for a purpose which will become apparent.

Formed in the headed end of the bolt 16 is an axial hole 26 which includes at its inner end an axial cavity 28 of reduced diameter. The axial hole 26 terminates short of the threaded portion of the bolt 16 a distance at least equal to half the diameter of the shank of the bolt. With this construction, the axial hole 26 produces no reduction in the tensile strength of the bolt 16, so long as the net cross sectional area of the bolt in the vicinity of the axial hole is at least equal to the net cross sectional area of the threaded portion of the bolt, as defined by the pitch diameter of the thread.

Disposed in the axial hole 26 is an indicating pin 30 the inner end of which is secured to the bolt 16 by pressing it into the axial cavity 28 in the particular construction illustrated. The portion of the indicating pin 30 between its secured inner end and its outer end is free to move axially relative to the bolt 16, the diameter of the axial hole 26 being sufficiently larger than the diameter of the indicating pin to permit this. The length of the indicating pin 30 is such that when its outer end 32 is flush with the outer end 34 of the head 22 on the bolt 16, the bolt is preloaded in tension to the desired degree. To provide high accuracy in registering the end face 32 of the indicating pin 30 with the end face 34 of the head 22 as the nut 18 is tightened to preload the bolt in tension, the end faces 32 and 34 are preferably ground perpendicular to the respective axes of the pin and the bolt.

It might be pointed out at this juncture that the indicating pin 30 should have thermal properties as close as possible to those of the bolt 16. The principal reason for this is to preclude relative axial expansion or contraction of the bolt 16 and the indicating pin 30 with changes in temperature. Another reason is to insure against loosening of the secured inner end of the indicating pin 30, creeping of the indicating pin relative to the bolt 16, and the like.

Considering the operation of setting the fastener 10, it will be apparent that as the nut 18 is threaded onto the bolt 16, the bolt elongates in proportion to the stress developed therein (as long as such stress is insufficient to produce a permanent set), whereas the indicating pin 30 does not, due to the fact that the unsecured portion thereof is free to move axially relative to the bolt. It will also be apparent that as the nut 18 is tightened to produce the aforementioned elongation of the bolt 16, the end face 32 of the indicating pin 30 moves toward the threaded end of the bolt. If the nut 18 is tightened until the end face 32 of the indicating pin 30 is precisely in register with, i.e., precisely flush with, the end face 34 of the head 22 on the bolt, the bolt will be preloaded in tension precisely to the predetermined extent for which the fastener 10 is designed.

The fastener 10 is shown in its properly preloaded condition in FIG. 1 of the drawing. FIG. 2 shows the fastener 10 insufficiently preloaded, as indicated by the fact that the indicating pin 30 projects from the head 22 of the bolt 16. Further tightening of the nut 18 will transform the condition of FIG. 2 to that of FIG. 1. In FIG. 3, the fastener 10 is shown as excessively preloaded, as indicated by the fact that the indicating pin 30 has been pulled into the head 22 on the bolt 16. The condition of FIG. 3 can be corrected, and transformed to that of FIG. 1, by loosening the nut 18 as required (assuming that the yield point of the material of the bolt has not been exceeded to produce a permanent set).

Illustrated in the drawing is a method of the invention of setting the fastener 10 to the desired tension preload, which method involves the use of a gauge or gauge block 40 having a flat, ground surface engageable with the flat, ground end surfaces 32 and 34 of the indicating pin 30 and the bolt 16. The thickness of the gauge block 40 is preferably less than the diameter of the indicating pin 30, as shown in FIG. 3 of the drawing. In setting the fastener 10, the end faces 32 and 34 of the indicating pin 30 and the bolt 16, and the gauge block 40, are back lighted by means of a relatively intense light source 42. With the gauge block 40 and the light source 42 in place, the nut 18 is tightened until no light is transmitted either between the gauge block and the end face 32 of the indicating pin 30, or between the gauge block and the end face 34 of the bolt head 22. (It will be noted in this connection that the axial recess 24 in the bolt head 22 permits viewing any light transmitted between the gauge block 40 and the end face 32 of the indicating pin 30, as under the conditions of FIG. 3 of the drawing.) Light from a relatively intense source, such as the source 42, can be seen through a very narrow gap, e.g., a gap of less than 0.0001 inch in width. Thus, extremely accurate registering of the end faces 32 and 34 of the indicating pin 30 and the bolt head 22 are possible through the use of the gauge block 40 and the back lighting source 42. As a consequence, extremely accurate preloading of the fastener 10 to the desired value is possible with the present invention.

An important feature of the present invention is that it provides methods of calibrating the fastener 10 extremely accurately so that the desired tension preload can be produced with high accuracy in the manner hereinbefore described. Basically, calibrating the fastener 10 involves loading it in tension to the desired value, and then registering the end faces 32 and 34 of the indicating pin 30 and the bolt head 22 very accurately while the bolt 16 is tensioned to the desired extent. Two different methods of doing this are shown in FIGS. 4 and 5, and will now be considered.

Turning to FIG. 4 of the drawing, the bolt 16 is shown in a calibrating apparatus 50 which includes means 52 engageable with the threaded end of the bolt for tensioning the bolt the desire extent, which may be of the order of 85 percent of its yield strength. While the bolt 16 is maintained in tension in this manner, the head 22 of the bolt and the indicating pin 30 are ground flat, in a plane perpendicular to the axes of the bolt and the indicating pin, to form the registering end faces 32 and 34, as by means of a grinding wheel 53. When the bolt 16 is removed from the calibrating apparatus 50 and installed in the manner herinbefore described, the tension preload developed in the calibrating apparatus may be duplicated with high accuracy by re-registering the end faces 32 and 34 in the manner hereinbefore described.

Turning to FIG. 5, the desired register of the end faces 32 and 34 of the indicating pin 30 and the bolt 16 may be achieved, with the bolt tensioned to the desired degree in the calibrating apparatus 50, by pressing the indicating pin into the axial cavity 28 while the bolt is in tension. The numeral 54 designates a suitable tool for pressing the indicating pin 30 into the axial cavity 28 until its end face 32 is flush with the end face 34 of the bolt. It will be noted that the tool 54 has flush surfaces respectively engageable with the end faces 32 and 34. When this procedure is followed, the end face 32 of the indicating pin 30 and the end face 34 of the bolt 16 are preferably pre-ground flat and perpendicular to the respective axes of these elements.

As previously discussed, the calibrated fastener 10 suffers no reduction in tensile strength because of the fact that the indicating pin 30 is installed in the headed end of the bolt 16 and the axial hole and cavity 26 and 28 terminate short of the threaded portion of the bolt a distance at least equal to half the diameter of the shank of the bolt, this being true as long as the net cross sectional area of the bolt in the vicinity of the axial hole is no less than the net cross sectional area of the threaded portion of the bolt, as defined by the pitch diameter of the thread. However, the calibrated fastener 10 can be used only where the headed end of the bolt 16 is accessible for the hereinbefore-described operation of registering the end faces 32 and 34 of the indicating pin 30 and the bolt.

In some instances, only the threaded end of the bolt is accessible for the preloading operation, in which case the indicating pin must be installed in the threaded end even though some loss of tensile strength results, particularly in the smaller bolt sizes. In larger bolt sizes, the loss in tensile strength can be held to a matter of only a few percent.

FIG. 6 of the drawing illustrates a calibrated fastener 60 which utilizes an indicating pin 62 in the threaded end of a bolt 64 having a head 66 of any suitable type at its other end. In the particular construction illustrated, the head 66 is of the internally-wrenchable, countersunk type. The indicating pin 62 has its inner end pressed into an axial cavity 68 adjacent the bolt head 66, the remaining portion of the indicating pin being free to move axially relative to the bolt in a slightly enlarged axial hole 70. In the particular application illustrated, the bolt 64 is shown in use to secure two structural members 72 and 74 together, the bolt being tensioned by a nut 76 having a lock washer 78 thereunder.

The fastener 60 may be calibrated in either of the ways hereinbefore described, and may be preloaded to its calibrated tension in the manner hereinbefore described by means of the gauge block 40 and the light source 42. In other words, the gauge block is seated against flat, ground end faces 82 and 84 on the indicating pin 62 and the bolt 64, respectively, and the nut 76 is adjusted until no light is transmitted between the gauge block 40 and either of the end faces 82 and 84. To facilitate viewing any light transmitted between the gauge block 40 and the end face 82 of the pin 62, the threaded end of the bolt 64 may be provided with a cross slot 86.

Although exemplary embodiments of the invention have been disclosed herein for purposes of illustration, it will be understood that various changes, modifications and substitutions may be incorporated in such embodiments without departing from the spirit of the invention as defined by the claims which follow:

I claim:
1. A method of calibrating a stressable device which includes a member stressable in a given direction and having therein a hole extending in said direction, which includes a pin insertable into said hole and having a securable portion pressable into a complementary portion of said hole and having a free portion movable relative to said member in response to any variation in the stress in said member in said direction, and which includes registerable indicia on said member and on said free portion of said pin for indicating a predetermined stress in said member in said direction, said method including the steps of:
  (a) inserting said pin into said hole;
  (b) developing said predetermined stress in said member in said direction; and then
  (c) pressing said securable portion of said pin into said complementary portion of said hole until said registerable indicia on said member and on said free portion of said pin are in register.

2. A method of calibrating a tensionable fastening device which includes a tensionable fastening member having an axial hole therein, which includes a pin insertable into said hole and having a securable portion pressable into a complementary portion of said hole and having a free portion movable axially relative to said member in response to any variation in the tension in said member, and which includes registerable indicia on said member and on said free portion of said pin for indicating a predetermined tension in said member, said method including the steps of:
  (a) inserting said pin into said hole;
  (b) developing said predetermined tension in said member; and then
  (c) pressing said securable portion of said pin into said complementary portion of said hole until said registerable indicia on said member and on said free portion of said pin are in register.

3. A method of calibrating a tensionable fastening device which includes a tensionable fastening member having in one end thereof an axial hole terminating in a reduced-diameter portion, which includes a pin insertable into said hole and having a securable portion pressable into said reduced-diameter portion of said hole and having a free portion movable axially relative to said member in response to any variation in the tension in said member, and which includes registerable end faces on said member and on said free portion of said pin for indicating a predetermined tension in said member, said method including the steps of:
  (a) inserting said pin into said hole;
  (b) developing said predetermined tension in said member; and then
  (c) pressing said securable portion of said pin into said reduced-diameter portion of said hole until said registerable end faces on said member and on said free portion of said pin are in register.

References Cited by the Examiner

UNITED STATES PATENTS 2,747,454  5/1956  Bowersett _____ 85—62

FOREIGN PATENTS 745,925  4/1944  Germany.

LOUIS R. PRINCE, *Primary Examiner.*